United States Patent [19]
Pott

[11] 3,786,549
[45] Jan. 22, 1974

[54] ARTICLE OF MANUFACTURE
[75] Inventor: Richard Pott, Heiden, Germany
[73] Assignee: Precismeca Gesellschaft Fur Fordertechnik mbH, Sulzbach-Saar, Germany
[22] Filed: Nov. 11, 1971
[21] Appl. No.: 197,806

[30] Foreign Application Priority Data
Nov. 12, 1970 Germany .................. G 70 41 835.8

[52] U.S. Cl. ................. 29/116 R, 29/132, 29/121 R
[51] Int. Cl. ............................................. B21b 13/02
[58] Field of Search .. 29/116 R, 121 R, 121 A, 132, 29/129.5, 130

[56] References Cited
UNITED STATES PATENTS
2,810,924  10/1957  Slingluff ........................... 29/116 R
3,571,878  3/1971  Alderfer ............................... 29/132
3,237,433  3/1966  Doleman et al. ................. 29/132 X
2,169,624  8/1939  Weiss et al. ..................... 29/121 A X
3,339,818  9/1967  Morrow ......................... 29/121 R X
3,405,456  10/1968  Shepherd ...................... 29/121 R X
3,475,803  11/1969  Hill ..................................... 29/132
3,662,446  5/1972  Walls ............................... 29/132 X
3,435,500  4/1969  Aser et al. ....................... 29/132 X Primary Examiner—Alfred R. Guest
Attorney, Agent, or Firm—Michael S. Striker

[57] ABSTRACT

A roller for use in conveyors has a roller body composed of a core part and an outer part which surrounds the core part. Either both parts or at least the outer part is composed of cellular synthetic plastic material which may be of the rigid type or of the elastically yieldable type.

8 Claims, 6 Drawing Figures

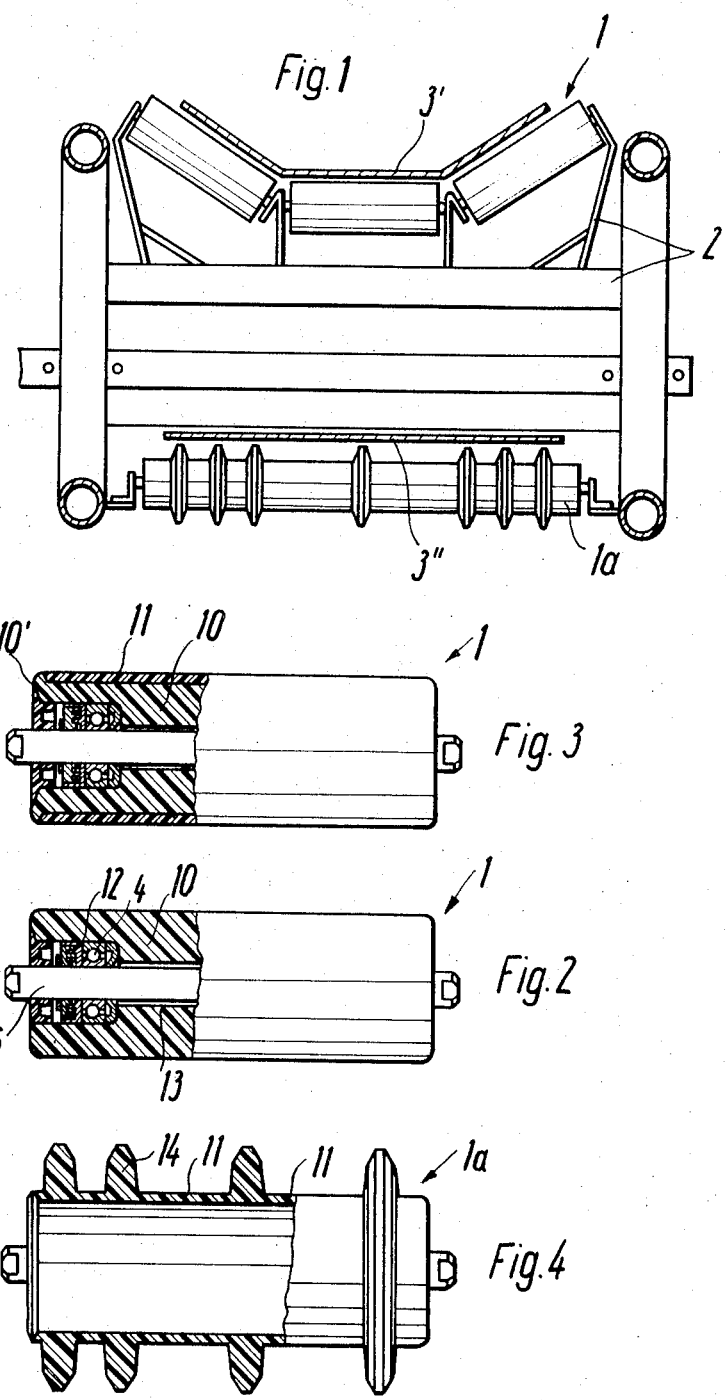

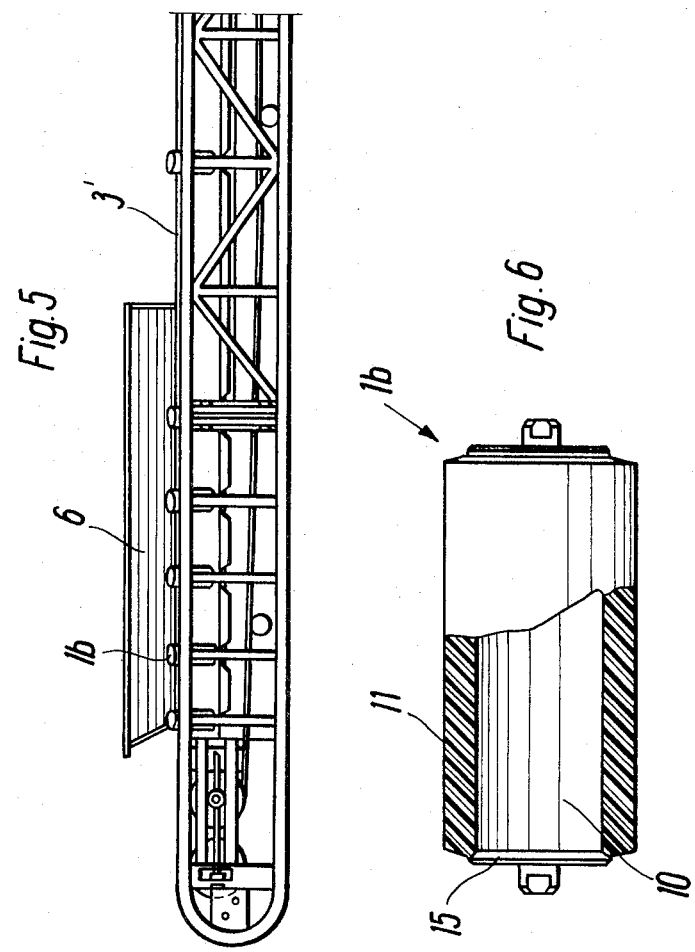

ARTICLE OF MANUFACTURE

BACKGROUND OF THE INVENTION

The present invention relates generally to rollers, and more particularly to novel rollers for use in conveyors, particularly supporting rollers or the like.

It is known to provide conveyors with various types of rollers. Supporting rollers, for instance, are configurated of a roller body composed of steel or synthetic plastic tubing at the ends of which are closing caps of sheet steel or other metallic material. The interior of the tubing is hollow and a stationary roller axis extends through it, the roller being journalled on two journals which are frequently protected against the entry of contaminants by axial or radial labyrinthine seals. This type of supporting roller construction is disadvantageous in that the outer circumferential wall of the roller is subject to strong wear and tear due to friction and corrosion. In addition, in cold weather, the rollers so constructed have a tendency to freeze to the conveyor belt or the like, which is frequently of rubber or a synthetic elastomer. Finally, the belt is in no way protected by contact with these rollers against damage.

If rollers of this type are used as buffer or impact rollers, then they are provided with rubber rings which are pushed over their peripheries and whose purpose it is to absorb the impact energy of the conveyor belt when the latter impacts them. The purpose of utilizing such rollers is to avoid damage to the conveyor belt itself and also to the journals. These buffer rollers have the disadvantage that they must be separately provided with the rubber rings which must be spaced at certain distances from one another in order to assure necessary lateral deformation under impact. This is expensive and such rollers are time-consuming to construct.

It is also known to provide support rollers which are provided on their outer periphery at equal or unequal distances with so-called supporting rings of solid cross-section, usually of rubber or an analogous elastomer. The purpose of these rollers is to prevent—when the lower or return run of the conveyor belt moves through its path—the adherence of residues of conveyed material to the rollers and the resulting undesired displacement of the belt with reference to the rollers. This type of roller has the disadvantage that the supporting rings must be applied either manually or by means of various mechanical aids, but in either case in a time-consuming manner which makes such rollers expensive. Additionally, the securing of the rubber rings on the rollers can be effected only by the pretressing in tension of the elastic material of the rings themselves. However, aging of the material of the rings results in a decrease of its elasticity and thus of its prestress, so that over a period of time these rings become very loosely seated on the roller and can move axially thereof. As a result of this, over a period of time such rings tend to effect displacement of the conveyor belt with reference to the roller, rather than to prevent it, and damage to the components of the conveyor, including the belt, usually results.

SUMMARY OF THE INVENTION

It is, accordingly, an object of the present invention to overcome the disadvantages of the prior art.

More particularly, it is an object of the present invention to provide an improved roller of the general type here under discussion which is not possessed of these disadvantages.

A concomitant object of the invention is to provide such a roller which is relatively inexpensive to construct and which nevertheless permits proper homogenous connection with any components which are to be provided on its periphery.

An additional object of the invention is to provide a conveyor construction utilizing such rollers.

In pursuance of these objects, and of others which will become apparent hereafter, one features of the invention resides, briefly stated, in a roller for use in conveyors which comprises a roller body having a core part and an outer part surrounding the core part. According to the invention at least the outer part is composed of cellular plastic material.

With this construction according to the present invention the roller body can in effect be produced of solid cross-section and may be made of a synthetic plastic material which is resistant to pressures and blows, being produced by foaming in an appropriate mold. A roller body so constructed is relatively inexpensive to produce and all complicated structural measures heretofore necessary are avoided. Thus, such a roller can also be provided with a core which is of solid hard-foam cellular plastic material, and can be surrounded with an outer circumferential part or sleeve which is deposited on it an is of elastically yieldable foam material. This outer part can also be provided with either a smooth outer circumferential surface or with annular rings or beads which can be produced of one piece with the outer part at the time the latter is produced. By utilizing appropriately selected materials, and in particular by utilizing related synthetic plastics, the core part and the outer part can be made to unite into a homogeneous monolithic whole, in combination with any support or buffer beads or rings which it may be desired to provide on the outer circumferential surface of the outer part.

According to the invention the roller body may also be provided at its opposite axial ends with axially extending recesses in which bearings, seals or the like may be accommodated. The diameter of these recesses should be larger than the diameter of the central passage connecting them and through which the shaft or axle on which the roller is to be mounted, will extend. In this manner the heretofore necessary end walls or end caps are omitted which usually consisted of metallic material. Not only does this result in a further decrease of the manufacturing and assembly expenses, but also it makes it possible to use the novel roller for the conveyance of chemically aggressive materials because the development of rust and the possibility of damage resulting from the influence of acids and bases are avoided. Because of the types of material utilized, the circumferential surface of the roller will absorb pressures exerted at the axial ends thereof without becoming bowed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic end-elevational view of a conveyor provided with rollers according to the present invention;

FIG. 2 is a partially sectioned side-elevational view of a roller according to one embodiment of the invention;

FIG. 3 is a view similar to FIG. 2 but illustrating a further embodiment of the invention;

FIG. 4 is a view similar to FIG. 3 illustrating an additional embodiment of the invention;

FIG. 5 is a diagrammatic fragmentary side view of the material-receiving end of a conveyor; and FIG. 6 is a view similar to FIG. 4 illustrating still another embodiment of the invention.

DESCRIPTION OF THE PREFERRED EMBODIMENTS

Before entering into a detailed discussion of the illustrated embodiments I wish to point out that no attempt has been made in this specification to provide details of processes by which rollers according to the present invention can be produced, or of molds to be utilized. Also, suitable synthetic plastic materials have been and are being identified only in general terms because the selection of a particular plastic material will to a substantial extent depend upon the conditions to which the roller is to be subjected and the environment in which it is to be used. However, the particular material or materials which are suitable can be readily determined—within the general guidelines provided herein—by routine experimentation which is well within the detail of those conversant with the art, as are the methods of making the rollers and any molds which may be utilized for this purpose.

To the extent that additional information may be desired, reference may be had concerning the selection of materials, their behavior, the methods of producing rigid or flexible synthetic plastic foams and the tools required for this purpose, to the "Plastic Engineering Handbook of the Society of the Plastics Industry, Inc.," published by the Reinhold Publishing Corporation of New York. Additional information is to be found in the "Military Standardization Handbook—Plastics," MIL-HD BK-700 (MR), and in particular Chapt. 6 dealing with cellular plastics and in Chapt. 7 dealing with plastics material selection factors.

Finally I also wish to point out that in so far as the term "duromeric plastic" is used herein, it refers to "durable" plastics as opposed to those which are of non-durable (i.e., readily destroyed) character.

With the above comments in mind, and referring firstly to FIG. 1, it will be seen that therein there is illustrated a conveyor having for instance a conveyor belt of elastomeric material and essentially composed of an upper run 3' and a lower or return run 3''. Reference numeral 2 identifies generally a support of the conveyor and reference numeral 1 identifies support rollers mounted on the support 2 and supporting the conveyor belt, in the illustrated embodiment the upper run 3' thereof.

The embodiment in FIG. 2 shows the simplest construction of such a supporting roller according to the present invention. Here the roller body of the supporting roller 1 is identified with reference numeral 10 and consists of a rigid cellular plastic material, preferably a polyurethane foam. Both the core part and the outer part (which is here unitary or of one piece with the core part) are of the same material, as is evident from the Figure. The opposite axial end faces of the body 10 are provided with axially extending recesses 12 in which bearings, seals or the like may be accommodated and which are generally identified with reference numeral 4. Evidently, the components which can be accommodated in these recesses 12 may vary in dependence upon the requirements of an individual application; such components do not form a part of the present invention. It is to be noted, however, that the diameter of the recesses 12 is greater than that of the passage 13 through which the shaft or axle extends on which the roller 1 is mounted. This shaft or axle is identified with reference numeral 5 and extends at opposite axial ends beyond the roller body 10, extending through the passage 13 with small play and being centered with respect to the roller body 10 by the bearings 4.

In the embodiment of FIG. 3 the construction is somewhat more complicated than in that of FIG. 2. Here the roller body 10 is again preferably composed of a rigid synthetic plastic foam. The outer part, however, is identified with reference numeral 11 and is composed of an elastically yieldable cellular synthetic plastic 11, having a lower Shore hardness than that of the body 10. The material of the outer part 11 can be formed on the outer circumference of the body 10.

To facilitate the provision of the outer part 11, and in order to also prevent relative displacement between it and the roller body 10, the latter is provided at its opposite axial ends with projecting annular beads 10' which project out beyond the outer circumference of the roller body 10 to such an extent as corresponds to the desired thickness of the outer part 11. The outer part 11 is then provided on the outer circumferential surface of the roller body 10 intermediate the beads 10'. During the foaming of the cellular material deposited onto the outer circumferential surface of the body 10, in particular a polyurethane of the type producing a soft foam as opposed to the polyurethane of the type producing a rigid foam for the body 10, these two related materials of the parts 10 and 11 become united into a homogeneous unit so that separation of the part 11 from the part 10 become very difficult. Pressure exerted against the axial end faces of the roller 1 is absorbed by the part 11 thereof without any bowing of the latter because of the elastic deformability of the material of the part 11.

In the embodiment of FIG. 4 the outer part 11 corresponds to the similarly designated outer part in FIG. 3. Here, however, the outer part 11 is formed of one piece with annular beads 14 extending circumferentially of its outer circumferential surface and being spaced at desired axial distances, either uniform or non-uniform distances. Because these beads 14 are of one piece with the outer part 11 it is impossible for them to become displaced axially of the roller so that the disadvantages heretofore existing in rollers having such beads—which were separately applied—are entirely avoided. Because both the roller body 10 and the outer part 11 with the beads 14 are of non-rusting relatively inexpensive material, any portions of the roller 1—for instance those intermediate the beads 14—which are not contacted by the conveyor belt but which may be contacted by material dropping off the same (see the use of such a roller 1a in FIG. 1 for supporting the return run 3'' of the conveyor belt) can no longer rust, become deformed or otherwise damaged as a result of contact with such material even if the material should be of the type which is chemically aggressive with respect to metal of which the rollers heretofore were conventionally made.

In FIG. 5 I have illustrated a portion of a conveyor where at the supply station 6 material is deposited onto the upper run 3' of the conveyor belt. In order to support the conveyor belt run 3' in the region of the supply station 6, where the material impacts upon the conveyor belt, there are provided impact rollers 1b which support the conveyor belt. These may be constructed, as in accordance with the present invention, as illustrated in FIG. 6.

In the embodiment of FIG. 6 the roller 1b again has an outer part 11 which is applied over the core part 10, of which the latter may again consist of rigid cellular plastic material. The outer part 11 is of a resiliently yieldable cellular plastic material having a lower Shore hardness than the material of the core part 10. It will be seen, however, that in this embodiment the outer part 11 has a substantially greater radial thickness than in the mere supporting rollers illustrated for instance in FIGS. 2 and 3, although this is only a question of degree and of dimensioning. Advantageously, the thickness in the embodiment of FIG. 6 should be approximately 15 mm or more for the outer part 11.

Because the outer part 11 becomes unitary with the inner part or core part 10, a continuous axial end face 15 is obtained for the roller 1b in FIG. 6, having the additional advantage that it is impossible for material dropping off the conveyor to become lodged in the spaces between adjacent rollers 1b, or between the portions 10 and 11 of such a roller. Bowing of the material of the outer part 11 as a result of axial pressures acting on the roller 1b is avoided because of the characteristics of the material of the part 11.

Evidently, other possibilities also exist for different embodiments. For instance, it is possible to make the core part 10 of metallic material, for instance an alloy steel or the like, and to provide only the outer part 11 of synthetic plastic cellular material, usually a resiliently compressible cellular material. On the other hand the core part 10—whether composed of metallic or plastic material—may be provided with an outer part 11 which is of rigid cellular material. The beads 14 need not be produced of one piece with the outer part 11, but the outer part 11 can be produced first and the beads 14 can be molded onto it in a separate operation.

Evidently, different materials will be suitable for the rigid or flexible cellular substances of the inner and outer parts, and this includes open or closed-celled foam materials, including two-component polyurethane foam of rigid character.

It will be understood that each of the elements described above, or two or more together, may also find a useful application in other types of applications differing from the types described above.

While the invention has been illustrated and described as embodied in an article of manufacture, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended

1. A roller arrangement for use in conveyors comprising, in combination, an elongated roller body composed of rigid foamed synthetic plastic material, said roller body having a peripheral surface, opposite axial ends, a central passage with an inner surface and of predetermined diameter, and inwardly extending recesses at said opposite axial ends of a diameter larger than said predetermined diameter; a substantially cylindrical cover of resiliently yieldable plastic foam material covering and firmly adhering to said peripheral surface of said roller body; a shaft having a diameter smaller than said predetermined diameter extending through said passage and having ends projecting beyond the corresponding axial ends of said roller body; and bearing means provided in said recesses and rotatably supporting said shaft with the axis thereof extending substantially coaxially with the axis of said elongated roller body so that intermediate said bearing means said shaft is inwardly spaced from said inner surface.

2. An arrangement as defined in claim 1, wherein said rigid foamed material is closed-cell polyurethane, and said resiliently yieldable foam material is polyurethane homogeneously foamed onto said peripheral surface so as to firmly adhere thereto, said cover having an outer circumferential surface defining a bearing surface for said roller arrangement.

3. An arrangement as defined in claim 1, wherein said rigid material is closed-cell two-component polyurethane.

4. An arrangement as defined in claim 1, wherein said rigid material is a duromeric plastic.

5. An arrangement as defined in claim 1, said cover having an outer circumferential surface provided with at least one circumferential annular bead of elastically yieldable material.

6. An arrangement as defined in claim 5, wherein said bead is of one piece with and of the same material as said outer part.

7. An arrangement as defined in claim 1, said cover having an outer circumferential surface provided with a plurality of at least substantially uniformly axially spaced raised annular beads.

8. An arrangement as defined in claim 5, wherein said cover has a radial thickness of at least 15 mm.

* * * * *